Oct. 26, 1943.   T. C. ZOLIK   2,333,067
SELF-LUBRICATING SHAFT AND LEADER PIN
Filed Jan. 30, 1942   2 Sheets-Sheet 1
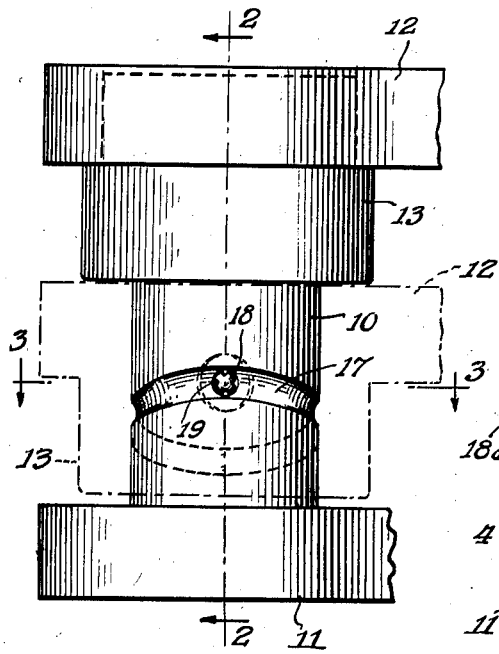
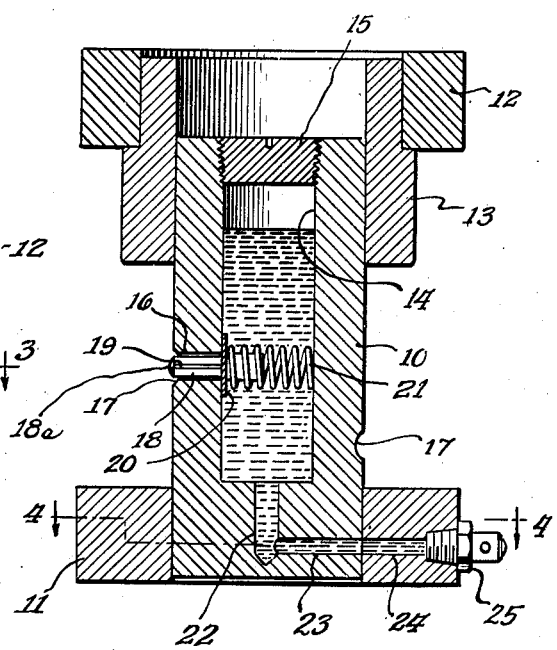
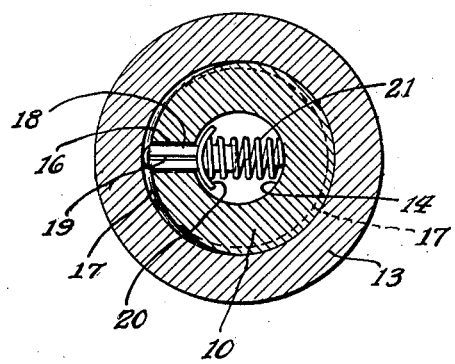
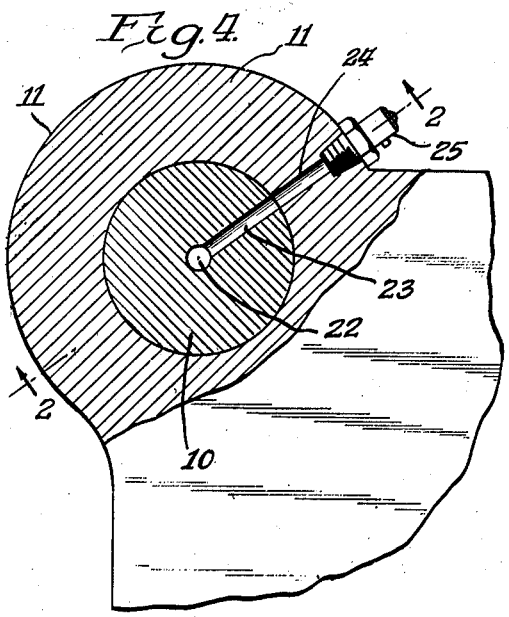
Inventor
Thomas C. Zolik.
By John F. Brezina
Attorney.

Oct. 26, 1943. T. C. ZOLIK 2,333,067
SELF-LUBRICATING SHAFT AND LEADER PIN
Filed Jan. 30, 1942 2 Sheets-Sheet 2
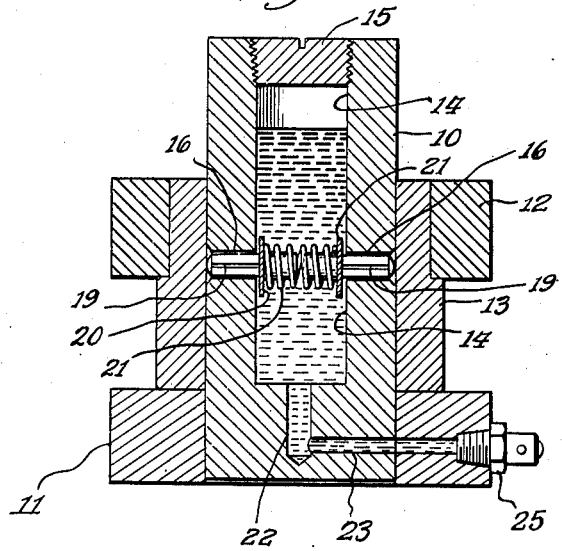
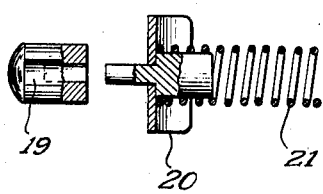
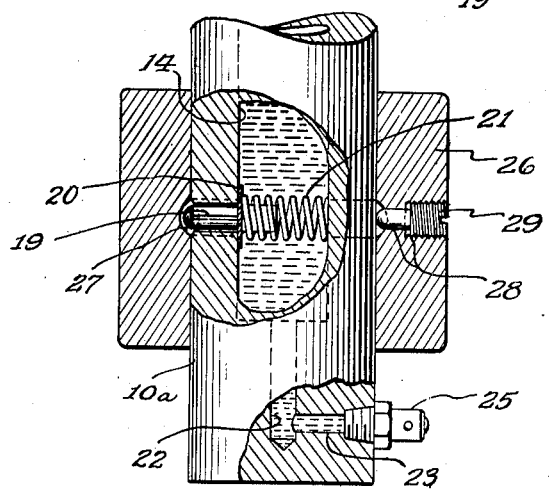
Inventor
Thomas C. Zolik
By John F. Brezina
Attorney Patented Oct. 26, 1943

2,333,067

UNITED STATES PATENT OFFICE 2,333,067

SELF-LUBRICATING SHAFT AND LEADER PIN

Thomas C. Zolik, Chicago, Ill.

Application January 30, 1942, Serial No. 428,831

8 Claims. (Cl. 308—5)

My invention is directed to self-lubricating shafts, pins or the like and structural means associated therewith which effectively lubricate the bearing surfaces by ejection intermittent or emission of suitable lubricant contained within the unit whose outer surface or surfaces provide a portion of the bearing surface.

It is an important object of my invention to provide bearings, shafts, leader pins or the like which have a suitable passage or cavity formed therein which is manually closable and which is adapted to be temporarily sealed by a closure element, and a valve pin slidably mounted in a suitably directed passage leading from said lubricant cavity to the bearing surface which also provides passages surrounding said pin to permit the lubricant to flow therethrough, and a pusher or agitation element connected to said pin and within the body of the lubricant so that as the outwardly projecting end of the pin is depressed the lubricant will be forced to the bearing surface.

A further object of my invention is the provision of a bearing unit including a shaft end and either slidable or rotatable element journalled thereon, wherein the shaft or pin is provided with a lubricant containing closable well, a passage or passages leading from said well to the shaft or pin surface and a spring pressed plunger or pin in each such passage which is normally held with its outer bevelled end projecting beyond the bearing surface so that as the surrounding element of the bearing unit, whether it be a hub, sleeve, ring, bushing or the like will cause each plunger or valve pin to be depressed intermittently, and upon movement of such outer bearing unit upwardly or downwardly or away from said pin, the provided spring will cause an inwardly extending part to force relatively small quantities of lubricant through the passage surrounding said pin (or pins) to thereby deliver such lubricant to the bearing surface where it is suitably spread by the cooperative slidable action of the bearing units.

A further object of my invention is a provision of novel leader pins or shafts which are provided with a closable lubricant-containing well, a passage or passages communicating said well to the bearing surface and a pin or plunger element mounted in such passage and having a lubricant-pushing member upon its inner end, the outer part which is slidable on the pin or pins being adapted to intermittently depress said pin or plunger and a spring means being adapted to return and project said pin to cause forced movement of the lubricant through spaces surrounding said pin to the bearing surface.

A further object of my invention is the provision of a bearing unit, which in most instances embodies a shaft and a retainable element such as a hub, bushing or sleeve with an annular groove which opens inwardly and upon the bearing surface, said groove having therein at one point a projection, lug, stud or the like; and a shaft, pin or equivalent element provided with a lubricant-containing well and spring-projectable pin or plunger in a passage communicating said well with the bearing surface, said projection on the outer bearing element being adapted to engage and depress the projecting end of said pin to cause ejection of lubricant to the bearing surface upon the return spring-pressed movement of said pin.

Other and further important objects of my invention will be apparent from the following descriptions, claims and accompanying drawings.

This invention (in a preferred form) is illustrated in the accompanying drawings and described by numerals of reference.

Fig. 1 is an elevational view of a typical leader pin mounted in a corner or ear portion of a die-set, with a corresponding fragment of the upper or cooperating portion of a die-set with its bushing forming a slidable bearing surface with said leader pin.

Fig. 2 is a cross-sectional view taken on a vertical plane indicated by line 2—2 of Fig. 1, and also indicated by line 2—2 in Fig. 4.

Fig. 3 is a cross-sectional view taken on the line 3—3 of Fig. 1 and looking downwardly.

Fig. 4 is a cross-sectional view taken substantially on line 4—4 of Fig. 2 and showing a fragment of corner portion of a typical die-set.

Fig. 5 is a vertical cross-sectional view of a bearing unit which in this illustration is a leader pin of a die-set and a corner portion of the cooperating die-set with its bushing mounted therein and in lower postion.

Fig. 6 is a partially side elevational view and partially cross-sectional view with parts broken away, showing the fragment of a typical shaft, pin or the like embodying my invention and having a hub, bushing, sleeve or the like rotatably mounted for rotatable movement thereabout.

Fig. 7 is an enlarged fragmentary view with parts broken away, showing one method of forming and assemblying the valve element shown in other views.

Referring to the drawings, reference numeral 10 designates a pin having a conventional round outer surface, and which in the particular form of the illustrations of the drawings is a leader pin or guide pin commonly known to be used with the lower die unit of a die-set. Said pin 10 is tightly mounted in a suitable hold in the end or corner portion of the die, depending upon the size and shape of the die-set. Numeral 11 designates the so-called corner or ear portion of the die-set which is shown in top plan in Fig. 4.

Reference numeral 12 designates a usually correspondingly shaped corner or ear portion of the upper part of the die-set, which has tightly mounted therein a suitable bushing or bearing 13. The inner surface of the bushing 13 is such size that it will closely fit for sliding movement on the pin 10, said movement being normally vertical and longitudinal of the pin. As is known, two or more of such guide or leader pins are necessary in die-sets, according to their size to guide the upper die-set part with respect to the lower part. As is noted from Fig. 2, the bushing 13 is provided with an annular shoulder which prevents the pushing out of said bushing during normal operations.

As shown in Figs. 1, 2 and 3, the leader pin 10 is formed with a longitudinal recess cavity or passage 14 which is formed by drilling from the end of the pin, and which forms the well for the lubricant. The upper end of said passage forming said well is preferably, though not necessarily, closed by a suitable threaded plug or cap 15 which when mounted provides a clearance or passage sufficient to permit passage of air into said well, and which cap in the particular illustration of the drawings is shown as threaded thereinto. I desire it to be understood that said entrance end of said well may be also satisfactorily closed by pressing or mounting thereinto a metal plug having an air passage, particularly in instances where other means for introducing the lubricant into the pin are provided, one form of which other means I describe herein.

The leader pin 10 is then provided with one or more passages 16 which communicate the lubricant well 14 with the outer bearing surface of the pin. The outer end of said passage 16 terminates in either a recess or groove 17 which preferably, though not necessarily, extends around the pin 10 and in a generally inclined direction as illustrated in Figs. 1 and 2 so that the lubricant delivery to the entrance of the passage 16 will by the aid of gravity more rapidly spread about the pin during normal operations.

Numeral 18 designates a suitable metal pin, which might also be termed a plunger element and which is of a size so that when mounted in said passage 16, some clearance is provided for passage of lubricant therethrough. In the preferred illustration of the drawings, the pin 18 is provided with a plurality of longitudinally extending outer opening grooves 19, preferably four in number, which grooves also provide suitable passages through which the lubricant passes through the outer bearing surface. I desire it to be understood that the grooves 19 are optional, as my device will satisfactorily operate without same where ample clearance is provided between the pin 18 and the wall passage in which it is mounted.

I desire it to be understood that wherever in the specification and claims I have used the term "leader pin" or similar term designating the inner element of the bearing, that the same is to be understood to include a shaft, a portion of whose surface is rotatably mounted with respect to another member closable therewith, and regardless of whether the shaft is rotatable with respect to such other member or with the other cooperating member such as a hub, bushing or the like, is rotatable or longitudinally movable on the shaft. It will be seen from my descriptions herein that my invention is equally satisfactorily applicable regardless of whether the pin or shaft moves or whether another cooperating member moves on said pin or shaft.

It is to be noted that the outer end of pin 18 is rounded or bevelled, said bevelled end being designated as 18a. The length of the pin 18 is such that it extends only a short distance into the well 14 substantially as illustrated in the drawings.

Secured upon the intermediate portion of the pin 18 and in a position to be within well 14, is a curbed washer disk or valve element 20 whose curvature conforms to that of the inner surface of the well. The size of this washer element is slightly larger than the cross sectional area of the passage 16. A metal spiral spring 21 of suitable size is mounted so that one end is substantially snug about the the inner end of pin 18 and its opposite end presses against the wall surface of the well 14 as indicated. The spring 21 normally holds the washer element 20 against the entrance end of passage 16, and said washer element thereby normally holds said passage 16 closed.

I have illustrated in Fig. 7 one optional manner in which the valve element and its stem or slidable pin may be formed and assembled. It will be noted that the pin 18 is made into two interfitting sections, the rearmost of which is provided with a stud or projection which is placed into the longitudinal outer portion of the pin after the valve element, which in the illustration is in the form of an arcuate washer-like member, is mounted between said sections so that said valve element is thereby impinged between said sections. This assembling operation may optionally be by inserting the outer section of the pin 18 through the lubricant outlet passage and pushing the inner pin section through the hole in the valve element, this in those instances where the size of the lubricant well would not permit mounting in any other manner. Thereupon the spring may be pressed into the position illustrated in the drawings. In the herein described instances where two lubricant outlets and valve elements are provided as illustrated in Fig. 5, the assembly may be the same as above described.

I desire it to be understood that while I have illustrated in Figs. 1, 2 and 3 the groove 17 as extending completely about the pin or shaft, that such groove may be substantially shorter and extend only partially about the shaft, and further that in instances where the slidable movement or rotative speed make it desirable, more than one groove extending in any desired direction may be employed.

In Fig. 5 I have illustrated the aforedescribed invention embodying two valve elements in the same pin or shaft whose respective stems are mounted for longitudinal movement in diametrically opposite lubricant outlet passages 16. It will be seen that in so lubricating the two valve elements of the aforedescribed construction, a single spring may be employed and be mounted as illustrated about the inner portions of the valve pins or valve stems 18. This duplication of said lubricating means results in a more rapid spreading of the lubricant upon the bearing surface, inasmuch as the lubricant needs to spread only one-half way around the bearing surface from each lubricant outlet.

As shown in Figs. 2 and 5, I have illustrated an optional means for conveniently replenishing the supply of lubricant in the well 14. While these two illustrations are with particular reference to the outer portions of either the upper or lower half of a die-set, as for example by mounting a suitable closable lubricant fitting directly into the outlet end of the passage which is within the shaft or pin itself, such as I have illustrated in the fragmentary cross sectional view of Fig. 6.

Referring to said Figs. 2, 5 and 6, numeral 22 designates a passage which is formed by drilling or the like leading from the lower end of the well 14 of the pin or shaft 10. Said passage 22 terminates short of the outer surface of said pin as indicated. In connection with constructions embodying my invention in die-sets and equivalent constructions, I form a passage 23 in the lower end of the pin or shaft as indicated and also form a passage 24 preferably in the ear or corner portion of the die-set as illustrated in Fig. 4. Said passages 23 and 24 may, if desired, be formed by one drilling operation after the pin or shaft 10 is mounted in the die-set, or may be formed separately. When formed separately, the pin is mounted in a position so that said passages register to form a continuous inlet passage communicating with passage 22. The outermost end of passage 24 is enlarged and threaded, and has mounted therein a suitable closure element or fitting 25, which may be of any desired form, and which in the illustration of the drawings is a self-closable lubricant fitting of conventional construction.

As illustrated in Fig. 6, a typical lubricant fitting 25 is threadingly mounted in the outer enlarged end of passage 24 directly in the shaft. It will be apparent that the size, location and direction of the said lubricant inlet passages may be varied according to the needs of the particular case with a view to making the same conveniently accessible, so that the lubricant may be quickly and easily introduced by said means into the lubricant well.

In Fig. 6 I have illustrated a shaft 10a which may be either rotatable or stationary which forms the inner member of a bearing. Said shaft 10a is provided with a well 14 which may be formed as previously herein described, and which may have said well provided with a lubricant inlet passage 23. Said passage 23 communicates with the lower end of the lubricant well, either directly or through a continuation of said passage, as for example by an inlet passage 22. The outer end of said passage 23 may have suitable closure or lubricant fitting 25 mounted therein as previously described.

In this construction, the shaft 10a is provided with the lubricant outlet passage 16, the valve element 20, spring 21 and the valve element stem or pin 18 which is preferably grooved or loosely mounted as has been described. The outer bevelled end of the valve element stem or pin is bevelled as has been described, and projects a short distance beyond the rounded surface of shaft 10a.

The outer cooperating member of the bearing 10a, which may assume the form of a hub, bushing, sleeve or bearing member and which is designated by numeral 26, is provided with an annular inwardly opening groove 27 which, when the parts are assembled, is in a location coinciding with the valve element and the slidable stem thereof, and regardless of whether the bearing member 26 is stationary or rotatable, it being understood that when one of the bearing members is stationary the other is rotatable with respect thereto. Bearing member 26 has a passage 28 formed therein, the outer end of which is preferably threaded, and a plug or stud 29 is threadingly secured in said passage 28. Said stud, projection or plug 29 has its inner end preferably reduced which fits snugly into the inner end of passage 28, and which projects a short distance into groove 27 to a point adjacent to or substantially close to the normal bearing surface of the shaft 10a.

As one of the bearing parts are rotated with respect to the other, which may be either the outer bearing member 26 or the shaft 10a, the inner end of the projection, stud or plug 29 once during each revolution engages the outer bevelled end of the pin or stem 18 to thereby push said pin or stem 18 inwardly against the action of the spring 21, and to open said valve and to cause some of the lubricant to flow behind the valve element toward said outlet passage 16, and as the stud or projection 29 passes the bevelled end of said pin or stem 18 the spring returns the valve to closed position to force out a relatively small quantity of the lubricant through the outlet passage 16 surrounding the surface of the pin or stem 18, and said stem or pin 18 has grooves therein to cause some of such lubricant to pass through said outlet grooves.

It will be apparent that in the case of a bearing element wherein the outer member of the bearing slides longitudinally with respect to the cooperating bearing member, that the valve element will be actuated in the hereinbefore described manner to force a relatively small quantity of lubricant through the described outlet passage or passages, which lubricant will spread over the bearing surface to efficiently lubricate the same. In instances where the two bearing elements are such that one is rotatable with respect to the other, as has been herein illustrated with respect of Fig. 6, the valve means described will be actuated to repeatedly force small quantities of lubricant through the described lubricant outlet passages to be spread upon the bearing surface and to maintain the same in a highly satisfactory lubricated condition.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim:

1. In a self lubricating bearing or leader pin, said leader pin having a closable lubricant-containing well therein, and having a lubricant outlet passage communicating said well and the outer bearing surface thereof; a valve element mounted in said passage, said valve element including a pin having a projecting bevelled end; said pin of said valve element being externally grooved; said leader pin being externally grooved, said projecting portion of said valve pin extending into said leader pin groove; and a spring mounted in said well and adjacent said outlet passage and engaging said valve pin and adapted to normally close said valve element; the bearing surface reciprocable on said leader pin being adapted to engage said bevelled end of said valve pin to depress the same and thereby open said valve, and said spring being adapted to move said valve to closed position to thereby expel lubricant through said outlet passage to said leader pin groove and outer surface.

2. In combination with a leader or bearing pin on which a separate bearing element is movable; said pin having an external groove and a closable lubricant well; a closure element for removably closing said well; a second closable inlet passage connecting said well to permit introduction of lubricant into said well; a self-closable lubricant fitting in the outer opening of said lubricant-inlet passage; a valve element in said lubricant outlet passage, said valve element including a pin slidable in said outlet passage, said pin having a bevelled end projecting outwardly; and a spring mounted in said well adapted to normally return said valve to closed position and to simultaneously force lubricant through said outlet passage surrounding said valve pin; said stem being adapted to be pressed inwardly by engagement of the inner surface of the separate bearing element slidable on said pin.

3. In a pin or the like forming a portion of a slidable bearing; a metal member having an external cylindrical bearing surface and having a longitudinal extending well and having passages communicating said well with said outer bearing surface; said metal member being externally grooved, said passages opening on said groove and extending angularly from said bearing surface to said well; a removable closure for said well; a valve element mounted on the inner end of each of said passages and within said well; a grooved stem slidably mounted in each of said passages and connected to said valve element, the outer end of each of said stems being bevelled; and a spring in said well and mounted to exert force against said valve elements to normally hold the same in closed position; the said bevelled ends of said valve stems being adapted to be engaged by a member movable on said metal member to thereby intermittently depress said stems and open said valves, the spring impelled return movements of said valves to closed positions being adapted to force lubricant through said outlet passage and through said external grooves of said pins to the surface of said metal member.

4. A shaft member having a closable lubricant compartment therein and having a lubricant outlet passage communicating said compartment and the outer surface of said shaft member; a grooved pin having its outer end bevelled and slidably mounted in said outlet passage; a substantially disk-like valve element forming a lubricant pushing member secured on the inner end of said grooved pin for closing said outlet passage and for pushing lubricant into and through said outlet passage, said element and lubricant pushing member having a sealing surface adapted to seat against the well side surface about said lubricant outlet to seal said outlet; and a spring in said compartment engaging said valve member and adapted to normally hold said valve member in closed position and to normally hold said pin with its bevelled end projecting from said shaft member surface; said grooved pin being adapted to be pushed inwardly by a bearing surface movable on said shaft member through engagement of said bevelled end, and said spring being adapted to cause said valve member to push lubricant into and through said outlet passage to thereby deliver same to the outer surface of said shaft member, said shaft member being externally grooved to facilitate the spreading of said lubricant about said shaft member.

5. A bearing including a shaft member having a closable lubricant compartment therein and having a lubricant outlet passage communicating said compartment and the outer surface of said shaft member; a grooved pin having its outer end bevelled and slidably mounted in said outlet passage; a valve member secured on the inner end of said grooved pin for closing said outlet passage; and a spring in said compartment engaging said valve member and adapted to normally hold said valve member in closed position; an outer rotatable member having a bearing surface in engagement with said shaft member and having an inwardly opening groove; and a stud in said rotatable member projecting into said groove and adapted to intermittently engage and depress said valve pin to cause said valve member to eject lubricant through said outlet passage.

6. In a bearing, a shaft or the like having an external bearing surface and a movable member rotatably journalled thereon, the rotatable member having a circumferential inwardly opening groove on its bearing surface; a stud element projecting into said groove; said shaft having a closable lubricant well therein and having one or more passages communicating said lubricant well with the bearing surface, said passages opening at points on said rotatable member groove; a valve element mounted in said lubricant outlet passage of said shaft, said valve element including a stem having its end projecting into the groove of said rotatable member; and a spring for returning said valve element to closed position and adapted to force lubricant through said lubricant outlet passage into said groove of said rotatable member, said rotatable member stud being adapted to engage and depress said valve element stem to open said valve upon each rotation.

7. A bearing pin or the like having a longitudinal closable well adapted to receive lubricant and having an outlet passage communicating said well and the outer bearing surface of said pin; a stem slidable in said communicating passage and having its outer end bevelled; said stem being composed of two interfitting joined together sections, said passage and said stem being disposed at an angle to the longitudinal axis of said pin; a valve-like disk-like member secured on the inner end portion of said stem and shaped to conform to the inner surface of said well and adapted to close said lubricant outlet passage, and adapted to entrap small quantities of lubricant between it and said wall of said well and to push the same through said outlet passage; a spring in said well having one end engaging said inner section of said valve element and adapted to normally hold said valve in closed position and adapted to return the same to closed position; said stem having grooves therein; another slidable bearing element cooperating with said pin being adapted to intermittently depress said stem to open said valve, and said spring being adapted to cause said valve element to force lubricant into and through said outlet passage surrounding said stem to the pin bearing surface.

8. In a self lubricating bearing or leader pin, said leader pin having a closable lubricant-containing well therein, and having a lubricant outlet passage communicating said well and the outer bearing surface; a valve element mounted in said passage, said valve element including a pin having a normally projecting bevelled end and being partially cut away to provide a lubricant passage between said pin and the adjacent wall of said lubricant outlet passage; and a spring mounted in said well and adjacent said outlet passage and engaging said valve element and adapted to normally close said valve element, the bearing surface movable on said first mentioned self lubricating bearing being adapted to engage said bevelled end of said pin to depress the same and thereby open said valve and said spring being adapted to move said valve to closed position to thereby expel lubricant through said outlet passage to the surface of said bearing pin.

THOMAS C. ZOLIK.